(12) United States Patent
Zhao (10) Patent No.: US 10,107,393 B2
(45) Date of Patent: Oct. 23, 2018

(54) METHOD OF PROVIDING VIRTUAL NULL POSITION FOR ELECTRONIC SHIFT LEVER

(71) Applicant: GM Global Technology Operations LLC, Detroit, MI (US)

(72) Inventor: Ming Zhao, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 205 days.

(21) Appl. No.: 15/354,352

(22) Filed: Nov. 17, 2016

(65) Prior Publication Data

US 2017/0248227 A1   Aug. 31, 2017

Related U.S. Application Data

(60) Provisional application No. 62/300,490, filed on Feb. 26, 2016.

(51) Int. Cl.
*F16H 61/22* (2006.01)
*F16H 59/02* (2006.01)
*F16H 59/10* (2006.01)
*F16H 61/36* (2006.01)

(52) U.S. Cl.
CPC ......... *F16H 61/22* (2013.01); *F16H 59/0278* (2013.01); *F16H 59/105* (2013.01); *F16H 61/36* (2013.01); *F16H 2059/0282* (2013.01)

(58) Field of Classification Search
CPC . F16H 2059/0282; F16H 59/105; F16H 61/22
See application file for complete search history.

(56) References Cited

U.S. PATENT DOCUMENTS

| | | | |
|---|---|---|---|
| 2014/0013890 A1* | 1/2014 | Kim | F16H 59/105 74/473.12 |
| 2014/0020496 A1* | 1/2014 | Heo | F16H 59/044 74/473.12 |
| 2014/0345412 A1* | 11/2014 | Wang | F16H 59/105 74/473.21 |
| 2015/0088387 A1* | 3/2015 | Bialas | F16H 61/0213 701/51 |

* cited by examiner

*Primary Examiner* — Edwin A Young (57) ABSTRACT

A method of providing improved control and response to an electronic transmission range selection system comprehends providing a virtual null position for the electronic transmission range selection device including the steps of determining the current position of the shift lever, confirming the position of the shift lever, virtual Null and physical Reverse to Neutral confirmation timer thresholds are selected, the timers are incremented, a determination is made that the timers have started, a determination is made that the virtual Null timer has expired, whereupon a virtual Null request is generated. Subsequent steps determine if the physical Neutral timer has expired and command the transmission to Neutral. In related method steps, a current range of the transmission is determined, the state of a shift interlock button is determined, and certain shift changes are accepted or rejected.

19 Claims, 6 Drawing Sheets

METHOD OF PROVIDING VIRTUAL NULL POSITION FOR ELECTRONIC SHIFT LEVER

CROSS REFERENCE TO RELATED APPLICATION

This application claims the benefit of U.S. Provisional Patent Application Ser. No. 62/300,490, filed Feb. 26, 2016, which is hereby incorporated in its entirety herein by reference.

FIELD

The present disclosure relates to methods of controlling automatic transmissions with electronic shift levers and more particularly to a method of controlling an automatic transmission with an electronic shift lever having a virtual null position.

BACKGROUND

The statements in this section merely provide background information related to the present disclosure and may or may not constitute prior art.

As the internal control systems of passenger cars and light trucks increasingly move from full mechanical systems such as throttle connections and gear selection to full electronic systems in which such mechanical connections are replaced by electrical sensors, microprocessors and servo devices, a constant goal is to provide not only the same performance, response and operator feel but also improved performance, reliability and safety.

One of the current features of such ongoing development is the electronic transmission range select (ETRS). In this device, a transmission shift lever having an orthogonal range of motion such as longitudinal, i.e., front to rear with one or more lateral, i.e., side to side, paths, essentially mimics a conventional shift lever which is linked mechanically to the transmission. However, in its modern configuration, the mechanical linkage is eliminated and replaced with, for example, position sensors at the shift lever, a transmission control module (TCM) and one or more solenoids or servo devices that effect range and/or gear selection of the transmission. For example, the shift lever may comprehend four physical positions: R (reverse), N (neutral), Null and D (drive) and it is spring biased to return to the Null position. In order for the operator to select certain active gear ranges, an interlock button, typically located on the side of the shift lever, must first be depressed and the shift lever must remain in the newly selected position for a certain minimum time in order for the system to validate and act upon a shift request.

As stated above, the goal of this and other electronic systems is to safely provide improved operator feel, response and performance. This goal may represent a significant challenge as safety considerations such as requiring a delay between gear selections and the activation of the interlock button may interfere with acting upon rapid operator inputs.

The present invention is directed to improving the driving experience with transmissions equipped with electronic transmission range select systems and ensuring that all operator commands are acted upon.

SUMMARY

The present invention provides improved operator control and transmission response to operator commands entered by an electronic transmission range shifter. The method of providing such improved control and response comprehends providing a virtual null position for the electronic transmission range selection device including the steps of determining the current position of the shift lever, confirming the position of the shift lever, virtual Null and physical Reverse to Neutral confirmation timer thresholds are selected, the timers are incremented, a determination is made that the timers have started, a determination is made that the virtual Null timer has expired, whereupon a virtual Null pulse is generated. Subsequent steps determine if the physical Neutral timer has expired and command the transmission to Neutral. In related method steps, a current range of the transmission is determined, the state of a shift interlock button is determined, and certain shift changes are accepted or rejected.

It is thus an aspect of the present invention to provide a method of controlling an automatic transmission with an electronic transmission range lever shifter having a virtual null position.

It is a further aspect of the present invention to provide a method of controlling an automatic transmission with an electronic transmission range lever shifter which accurately responds to operator requested shifts.

It is a still further aspect of the present invention to provide a method of controlling an automatic transmission with an electronic transmission range lever shifter which determines and confirms the present position of the shift lever.

It is a still further aspect of the present invention to provide a method of controlling an automatic transmission with an electronic transmission range lever shifter which establishes virtual Null and physical Reverse to Neutral timer thresholds.

It is a still further aspect of the present invention to provide a method of controlling an automatic transmission with an electronic transmission range lever shifter which establishes virtual Null and physical Reverse to Neutral timer thresholds and increments such timers.

It is a still further aspect of the present invention to provide a method of controlling an automatic transmission with an electronic transmission range lever shifter which establishes virtual Null and physical Reverse to Neutral timer thresholds and determines when such timers have expired.

It is a still further aspect of the present invention to provide a method of controlling an automatic transmission with an electronic transmission range lever shifter which determines a position of a shift interlock button.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
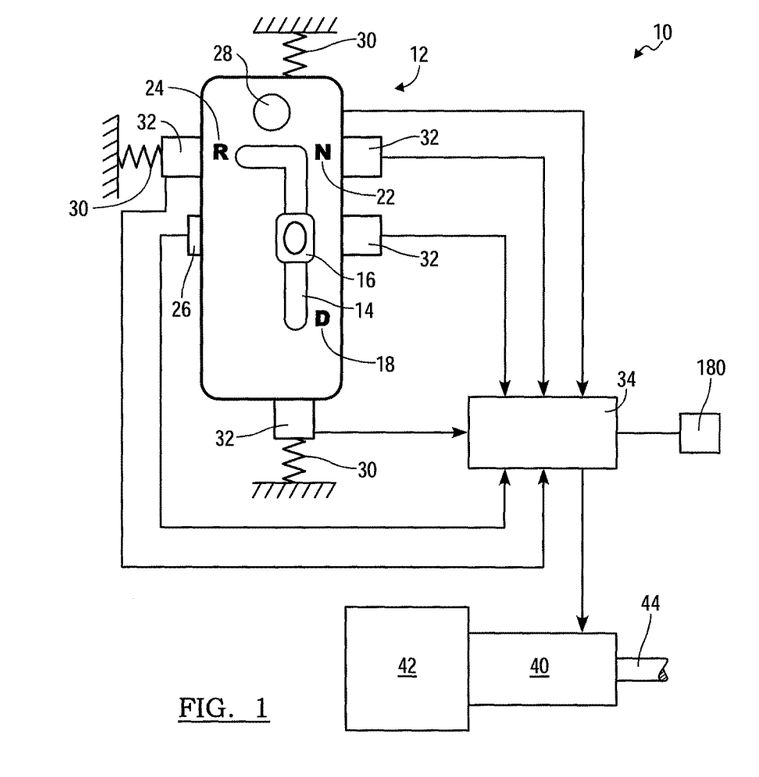
FIG. 1 is a schematic view of an electronic transmission range selector, control module and transmission incorporating the present invention.

With reference to FIG. 1, an electronic transmission range selection system associated with the present method is illustrated and generally designated by the reference number 10. The electronic transmission range selection system 10 includes a shift lever 12 disposed in and constrained to translate along an inverted "L" shaped track 14. The shift lever 12 is illustrated in a Null position 16 and has a "D" or Drive selecting position 18 to the rear (or down) and an "N" or Neutral selecting position 22 to the front (or up). To the left of the Neutral selecting position 22 is an "R" or Reverse selecting position 24. The shift lever 12 includes an interlock button or switch 26. The shift lever 12 further includes a "P" or Park button or switch 28. Both the interlock button or switch 26 and the Park button or switch 28 are two position, momentary contact devices that may be depressed or activated by the vehicle operator.

The shift lever 12 is biased into the Null position 16 by a plurality of springs 30, typically compression springs. A plurality of sensors 32 provide data or signals regarding the current position of the shift lever 12 (Null, N, D and R) to a transmission control module 34. The states of the interlock button or switch 26 and the Park button or switch 28, i.e., depressed or released, are also provided to the transmission ETRS control module (TRSCM) 34 which, in turn, provides outputs or control signals commanding the currently selected gear state to actuators, operators or servos (not illustrated) in an automatic transmission 40. The automatic transmission 40 is driven by a prime mover 42 such as an internal combustion, gasoline, Diesel or flex-fuel engine or hybrid power plant. The automatic transmission 40 includes an output or prop shaft 44 which is coupled to and drives a final drive assembly (not illustrated).

Figure 2A:
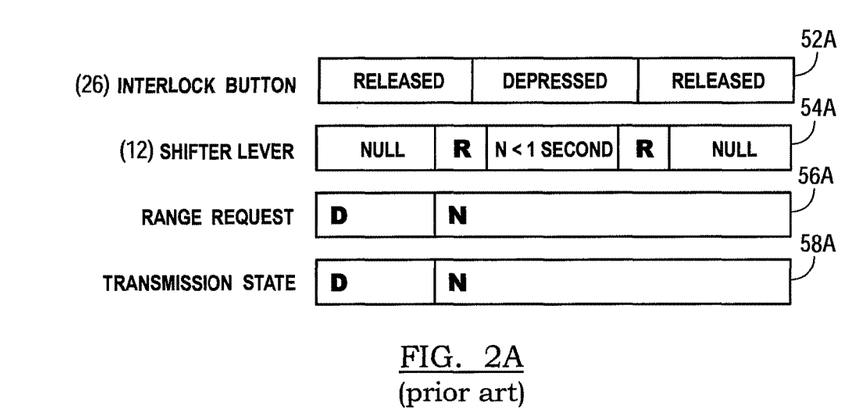
FIGS. 2A and 2B are time line graphs illustrating the sequence of operation during shift commands of an electronic transmission range selector of the prior art and with the present invention, respectively.
Figure 2B:
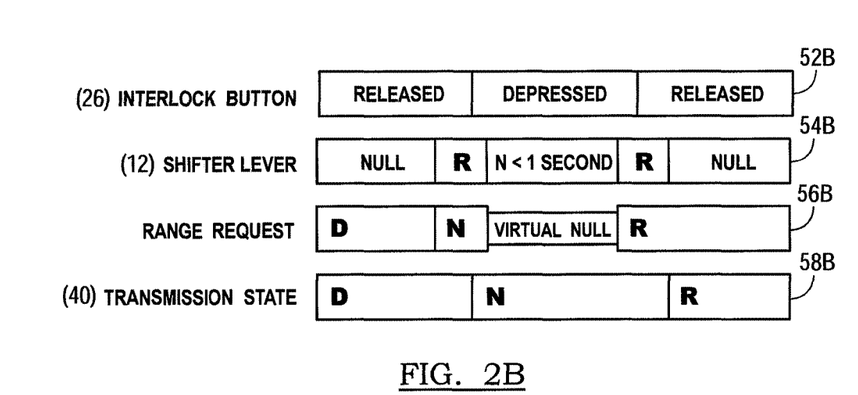

Referring now to FIGS. 1 and 2A and 2B, two time line graphs having four lines or tracks illustrate the sequence of operation during a shift command to an electronic transmission range select system. FIG. 2A illustrates a sequence of shift commands to a prior art system which misses or ignores a request to shift into reverse. FIG. 2B illustrates the same sequence of shift commands provided to the system 10 according to the present invention which accurately interprets same and commands a shift into Reverse. The four tracks or lines 52A, 54A, 56A and 58A represent the positions of the interlock switch 26 and the shift lever 12 in a prior art control system as well as the range request from the transmission control module to the automatic transmission and the actual state (gear or range) of the automatic transmission, respectively. The four tracks or lines 52B, 54B, 56B and 58B represent the positions of the interlock switch 26 and the shift lever 12 in an electronic transmission range selection system 10 according to the present invention, the range request from the transmission control module 34 to the automatic transmission 40 and the actual state (gear or range) of the automatic transmission 40, respectively.

As illustrated the track or line 54A of FIG. 2A, the vehicle operator initially has moved the shift lever 12 from the Null position 16, to the Reverse selecting position 24, to the Neutral selecting positon 22 for less than a selection separation interval, then back to the Reverse selecting position 24. Finally, the vehicle operator releases the shift lever 12 and it returns to the Null position 16. As shown in the line or track 52A, when the shift lever 12 is in the Reverse selecting position 24, the vehicle operator depresses the interlock switch or button 26 and does not release it until the shift lever 12 is moved to the Reverse selecting position 24 for the second time. The line or track 56A presents the range request provided by a transmission control module to an automatic transmission. It will be appreciated that the request for Reverse gear is ignored because although the interlock switch or button 26 was depressed, the one second selection separation interval overrode the Reverse request since the shift lever 12 was in the Neutral position 22 for less than the selection separation interval. As the line or track 58A illustrates, the transmission thus shifts from Drive to Neutral and remains there, ignoring the operator shift request for Reverse range.

As illustrated in track or line 54B of FIG. 2B, again the vehicle operator has moved the shift lever 12 from the Null position 16, to the Reverse selecting position 24, to the Neutral selecting positon 22 for less than a selection separation interval of one second as imposed by the transmission control module 34, then back to the Reverse selecting position 24. Finally, the vehicle operator releases the shift lever 12 and it returns to the Null position 16. As shown in the line or track 52B, when the shift lever 12 is in the Reverse selecting position 24 for the first time, the vehicle operator depresses the interlock switch or button 26 and does not release it until the shift lever 12 is moved to the Reverse selecting position 24 for the second time. The line or track 56B presents the range request provided by the transmission control module 34 to the automatic transmission 40. As illustrated, the first request for Reverse gear is ignored because the interlock switch 26 was not depressed. However, the virtual Null provided by the present invention satisfies the selection separation interval, typically about one second, and residence of the shift lever 12 in the Neutral position 22. Thus sufficient null or Neutral time has been provided such that that the transmission control module 34 accepts the second request from the Reverse selecting position 24 and commands Reverse gear. As the line or track 58B illustrates, the transmission 40 first shifts from Drive range to Neutral and thence to Reverse range, fully complying with the shift request of the vehicle operator.

Figure 3:
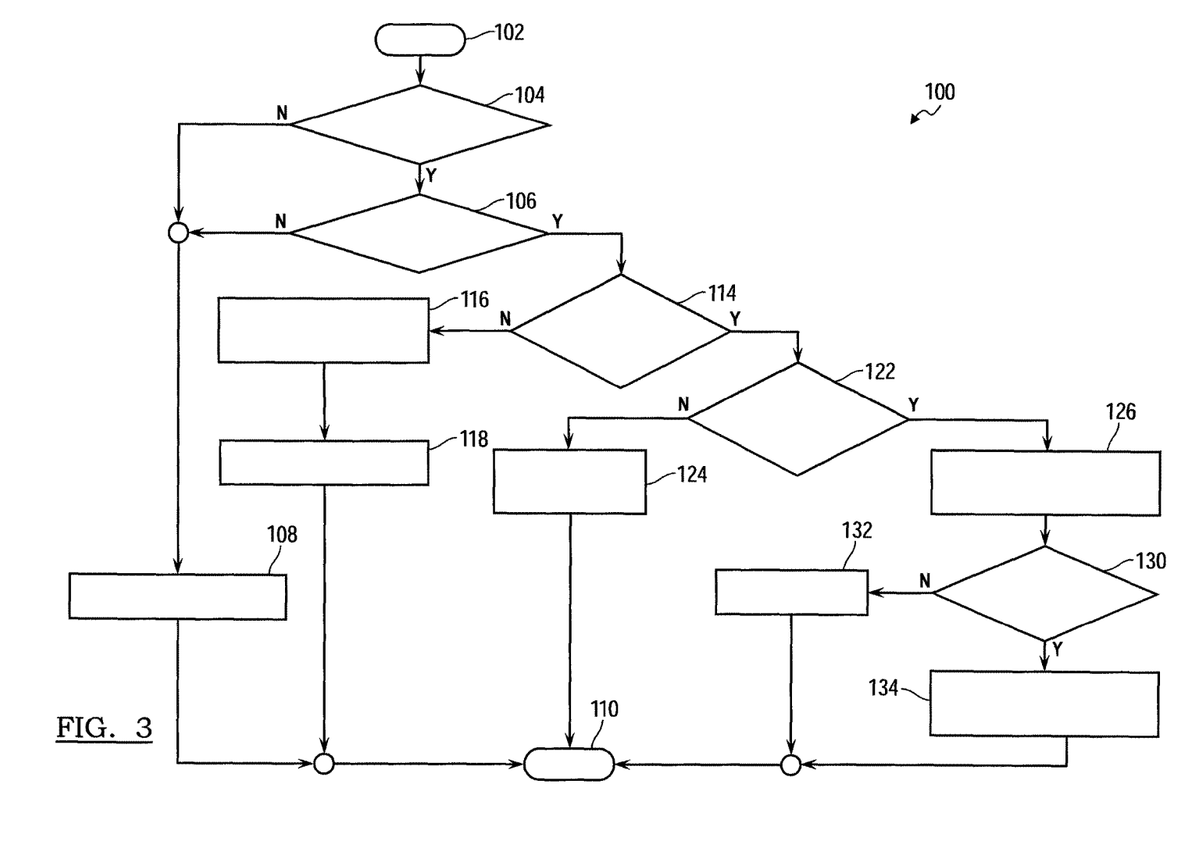
FIG. 3 is a flow chart of the method of the present invention illustrating the generation of a virtual null signal when moving an electronic transmission range lever shifter from Reverse range to Neutral.

Referring now to FIG. 3, a flowchart illustrating the steps of the present method provides an algorithm for insertion of a virtual Null position between the physical Reverse position of the shift lever 12 and the physical Neutral position of the shift lever 12, which may be embodied and performed in electronic memory and software residing within a microprocessor in the transmission control module 34, is illustrated and generally designated by the reference number 100. The method 100 begins with a conventional start or initializing step 102 which, for example, resets and clears registers and reads the current values of the switches 26 and 28 and the sensors 32. The method 100 then moves to a first decision point 104 which confirms that the position of the shift lever 12 is in the Reverse selecting position 24. By use of the word "confirmed," it is meant that, given a typical algorithm or program looping or iteration time of, for example, 100 milliseconds for the method 100, several loops or iterations have been completed such that the reliability of this decision is high. If it is not confirmed, the first decision point 104 is exited at NO. If the position of the shift lever 12 is confirmed as in the Reverse selecting position 24, the first decision point 104 is exited at YES and the method 100 moves to a second decision point 106 that inquires whether the sampled, i.e., current, position of the shift lever 12 is in the Neutral position 22. If it is not, the second decision point 106 is exited at NO. If either the first decision point 104 or the second decision point 106 is exited at NO, the method 100 moves to a first process step 108 which stops and resets both the virtual Null and the physical Neutral confirmation timers, which will be described in more detail subsequently, and the method 100 terminates in a stop or end instruction 110.

If the second decision point 106 determines that the sampled position of the shift lever 12 is in the Neutral position 22, the second decision point 106 is exited at YES and the method 100 moves to a third decision point 114 which inquires or determines whether the virtual Null and the physical Neutral confirmation timers have started. If they have not, the third decision point 114 is exited at NO and the method 100 moves to a second process step 116 which selects and sets the virtual Null and physical Reverse gear to Neutral confirmation timer thresholds. It should be understood that an assumption is here made that the virtual Null timer threshold is less than the physical Reverse range to Neutral confirmation timer threshold. After setting these timer thresholds in the second process step 116, a third process step 118 starts the virtual Null and the physical Neutral confirmation timers. Upon completion of the third process step 118, the method 100 moves to the stop instruction or end point 110.

If it is determined that the virtual Null and the physical Neutral confirmation timers have started, the decision point 114 is exited at YES and the method 100 moves to a fourth decision point 122 which determines whether the virtual Null confirmation timer started in the third process step 118 has expired, i.e., has timed out. If it has not, the fourth decision point 122 is exited at NO and the method 100 moves to a fourth process step 124 which increments the virtual Null and the physical Neutral confirmation timers with every loop execution. The method 100 then terminates in the stop instruction or end point 110.

If it is determined that the virtual Null confirmation timer started in the third process step 118 has expired, the fourth decision point 122 is exited at YES and the method 100 moves to a fifth process step 126 which sets the confirmed position of the shift lever 12 as the Null position and inserts or generates the rising edge of a virtual Null pulse or signal. This signal or pulse is utilized in and by the additional methods and algorithms set forth in FIGS. 4, 5, and 6 and the accompanying text. The method 100 then moves to a fifth decision point 130 which determines whether the physical Neutral confirmation timer has expired, i.e., timed out. If it has not, the fifth decision point 130 is exited at NO and a sixth process step 132 is encountered. The sixth process step 132 also increments the Neutral confirmation timer with every execution loop and the method 100 then terminates at the stop instruction or termination point 110. If, at the fifth decision point 130, it is determined that the physical Neutral confirmation timer has expired, the fifth decision point 130 is exited at YES and a seventh process step 134 is encountered which commands a Neutral request to the transmission 40. The method 100 then terminates at the stop instruction or step 110.

Figure 4:
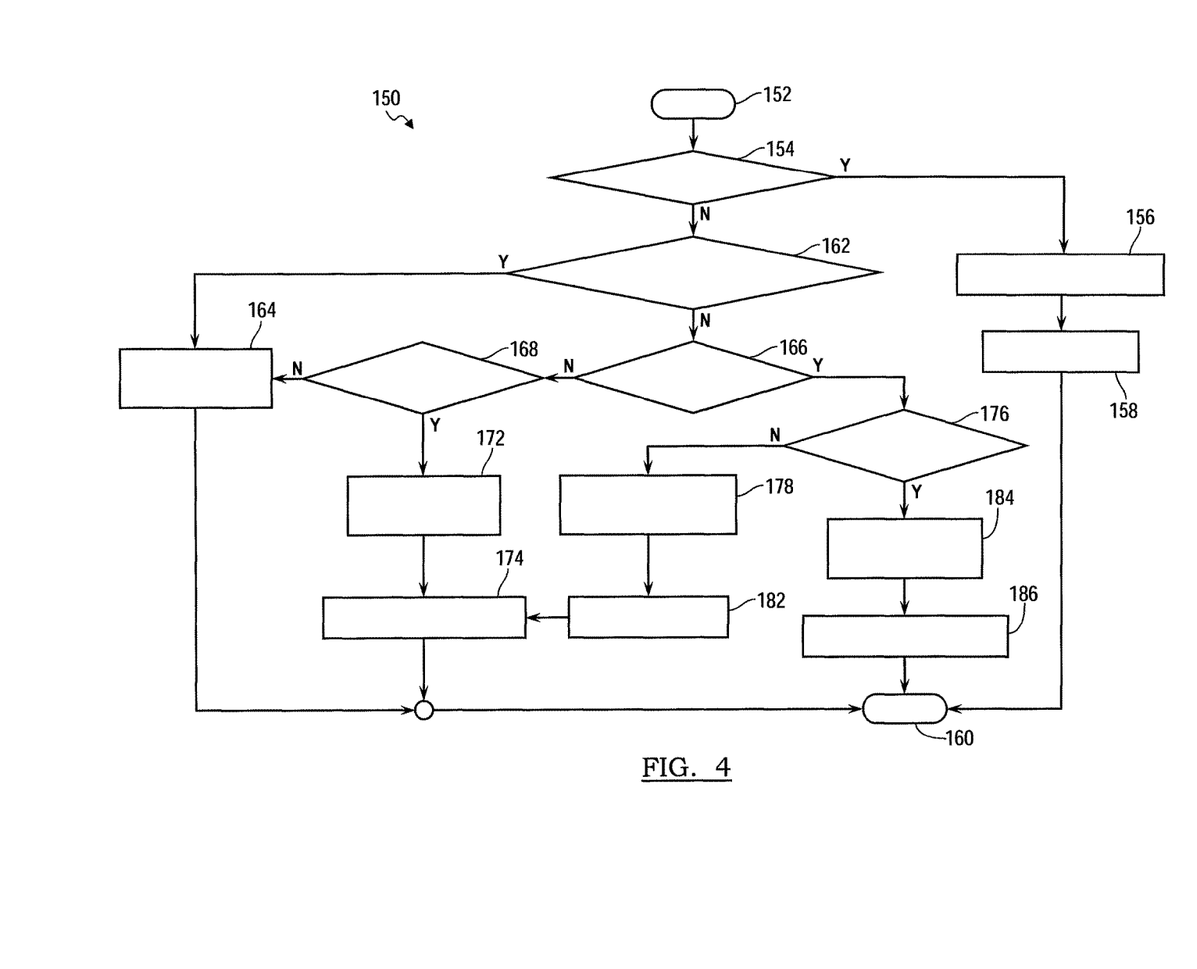
FIG. 4 is a flow chart of the method of the present invention illustrating a shift request for Neutral or Reverse range while in Drive range.

Referring now to FIG. 4, an associated portion of the method 100 illustrates how the virtual Null pulse or signal generated in FIG. 3 is utilized by the electronic transmission range selection system 10 to process an operator Reverse or Neutral shift request when the transmission 40 is in the Drive range and is generally designated by the reference number 150. Once again, the method 150 begins with an initializing or start step 152 and moves to a first decision point 154 which confirms that the shift lever 12 is in the Null position. Again, the word "confirms" is utilized here as described above. If the Null position of the shift lever 12 is confirmed, the first decision point 154 is exited at YES and the method 150 moves to a first process step 156 which resets any previously confirmed and set position of the shift lever 12 to Null. An associated second process step 158 then reports the new state of the shift lever 12 as the Null position. This portion of the method 150 then terminates at an end or termination step 160.

Returning to the first decision point 154, if it is not confirmed that the shift lever 12 is in the Null position, the first decision point 154 is exited at NO and the method 150 enters a second decision point 162 which determines whether the current confirmed position of the shift lever 12 is the same as the previously confirmed position of the shift lever 12. If it is, the second decision point 162 is exited at YES and the method 150 moves to a third process step 164 which commands the transmission 40 to operate in the Drive range. If the current confirmed position of the shift lever 12 is not the same as the previously confirmed position of the shift lever 12, the second decision point 162 is exited at NO and the method 150 moves to a third decision point 166 which inquires whether the confirmed position of the shift lever is Reverse range. If it is not, the third decision point 166 is exited at NO and a fourth decision point 168 is encountered which inquires whether the confirmed position of the shift lever 12 is Neutral. If it is not, the method 150 exits the fourth decision point 168 at NO and returns to the third process step 164 which commands the transmission 40 to operate in the Drive range. If the fourth decision point 168 determines that the confirmed position of the shift lever 12 is Neutral, it is exited at YES and the method 150 moves to a fourth process step 172 which commands the transmission 40 to Neutral. From the fourth process step 172, the method 150 moves to a fifth process step 174 which resets the previously confirmed position of the shift lever 12 to Neutral. The method 150 then terminates at the end point or termination step 160.

Returning to the third decision point 166, if the current confirmed position of the shift lever 12 is Reverse range, the third decision point 166 is exited at YES and the method 150 moves to a fifth decision point 176 which determines whether the interlock switch or button 26 is depressed. If it is not, the method 150 moves to a sixth process step 178 which rejects the operator's Reverse range request and, optionally, sends a signal to a Driver Information Center (DIC) 180, illustrated in FIG. 1, which provides, for example, a visual indication that the operator must first depress the interlock button (26) before moving the shift lever (12) or that the request for Reverse range will not be acted upon unless this is done. From the sixth process step 178, the method 150 moves to a seventh process step 182 which commands the transmission 40 to Neutral. The method 150 then returns to the fifth process step 174 which resets the previously confirmed position of the shift lever 12 to Neutral.

Returning to the fifth decision point 176, if the interlock button or switch 26 is depressed, the fifth decision point 176 is exited at YES and the method 150 then encounters an eighth process step 184 which commands the transmission 40 into the Reverse range as requested by the vehicle operator. A final, ninth process step 186 resets the previously confirmed position of the shift lever 12 to Reverse range. The method 150 then terminates at the end point or termination step 160.

Figure 5:
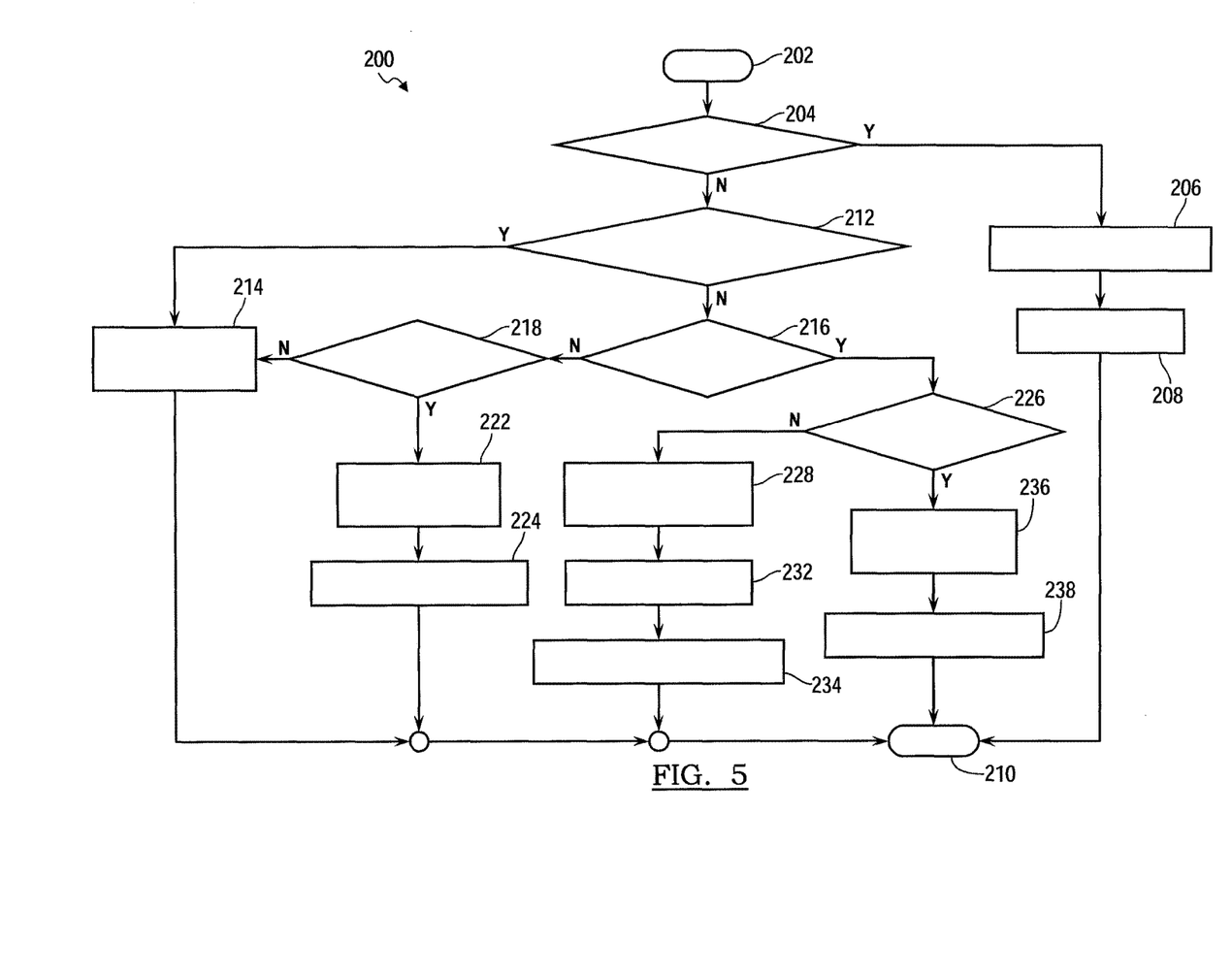
FIG. 5 is a flow chart of the method of the present invention illustrating a shift request for Reverse or Drive range while in Neutral.

Referring now to FIG. 5, an associated portion of the method 100 illustrates how the virtual null pulse or signal generated in FIG. 3 is utilized by the electronic transmission range selection system 10 to process an operator shift request for Reverse range or Drive range while the transmission 40 is in Neutral and is generally designated by the reference number 200. Once again, the method 200 begins with an initializing or start step 202 and moves to a first decision point 204 which confirms that the shift lever 12 is in the Null position. Again, the word "confirms" is utilized here as described above. If the Null position of the shift lever 12 is confirmed, the first decision point 204 is exited at YES and the method 200 moves to a first process step 206 which resets any previously confirmed and set position of the shift lever 12 to Null. An associated second process step 208 then reports the new position of the shift lever 12 as the Null position. This portion of the method 200 then terminates at an end or termination step 210.

Returning to the first decision point 204, if it is not confirmed that the shift lever 12 is in the Null position, the first decision point 204 is exited at NO and the method 200 enters a second decision point 212 which determines whether the current confirmed position of the shift lever 12 is the same as the previously confirmed position of the shift lever 12. If it is, the second decision point 212 is exited at YES and the method moves to a third process step 214 which commands the transmission 40 to Neutral. If the current confirmed position of the shift lever 12 is not the same as the previously confirmed position of the shift lever 12, the second decision point 212 is exited at NO and the method 200 moves to a third decision point 216 which inquires whether the confirmed position of the shift lever is Reverse range. If it is not, the third decision point 216 is exited at NO and a fourth decision point 218 is encountered which inquires whether the confirmed position of the shift lever 12 is the Drive range. If it is not, the method 200 exits the fourth decision point 218 at NO and returns to the third process step 214 which commands the transmission 40 to Neutral. If the fourth decision point 218 determines that the confirmed position of the shift lever 12 is the Drive range, it is exited at YES and the method 200 moves to a fourth process step 222 which commands the transmission 40 to the Drive range. From the fourth process step 222, the method 200 moves to a fifth process step 214 which resets the previously confirmed position of the shift lever 12 to the Drive range. The method 200 then terminates at the end point or termination step 210.

Returning to the third decision point 216, if the current confirmed position of the shift lever 12 is Reverse range, the third decision point 216 is exited at YES and the method 200 moves to a fifth decision point 226 which determines whether the interlock switch or button 26 is depressed. If it is not, the method 200 exits the fifth decision point 226 at NO and moves to a sixth process step 228 which rejects the operator's Reverse range request and, optionally, sends a signal to the Driver Information Center (DIC) 180 indicating, for example, that the operator must first depress the interlock button (26) before moving the shift lever (12) or that the request for Reverse range will not be acted upon. From the sixth process step 228, the method 200 moves to a seventh process step 232 which commands the transmission 40 to Neutral. The method 200 then enters an eighth process step 234 which resets the previously confirmed position of the shift lever 12 to Neutral. The method 200 terminates at the end point 210.

Returning to the fifth decision point 226, if the interlock button or switch 26 is depressed, the fifth decision point 226 is exited at YES and the method 200 then encounters a ninth process step 236 which commands the transmission 40 into the Reverse range as requested by the vehicle operator. A final, tenth process step 238 resets the previously confirmed position of the shift lever 12 to Reverse range. The method 200 then terminates at the end point or termination step 210.

Figure 6:
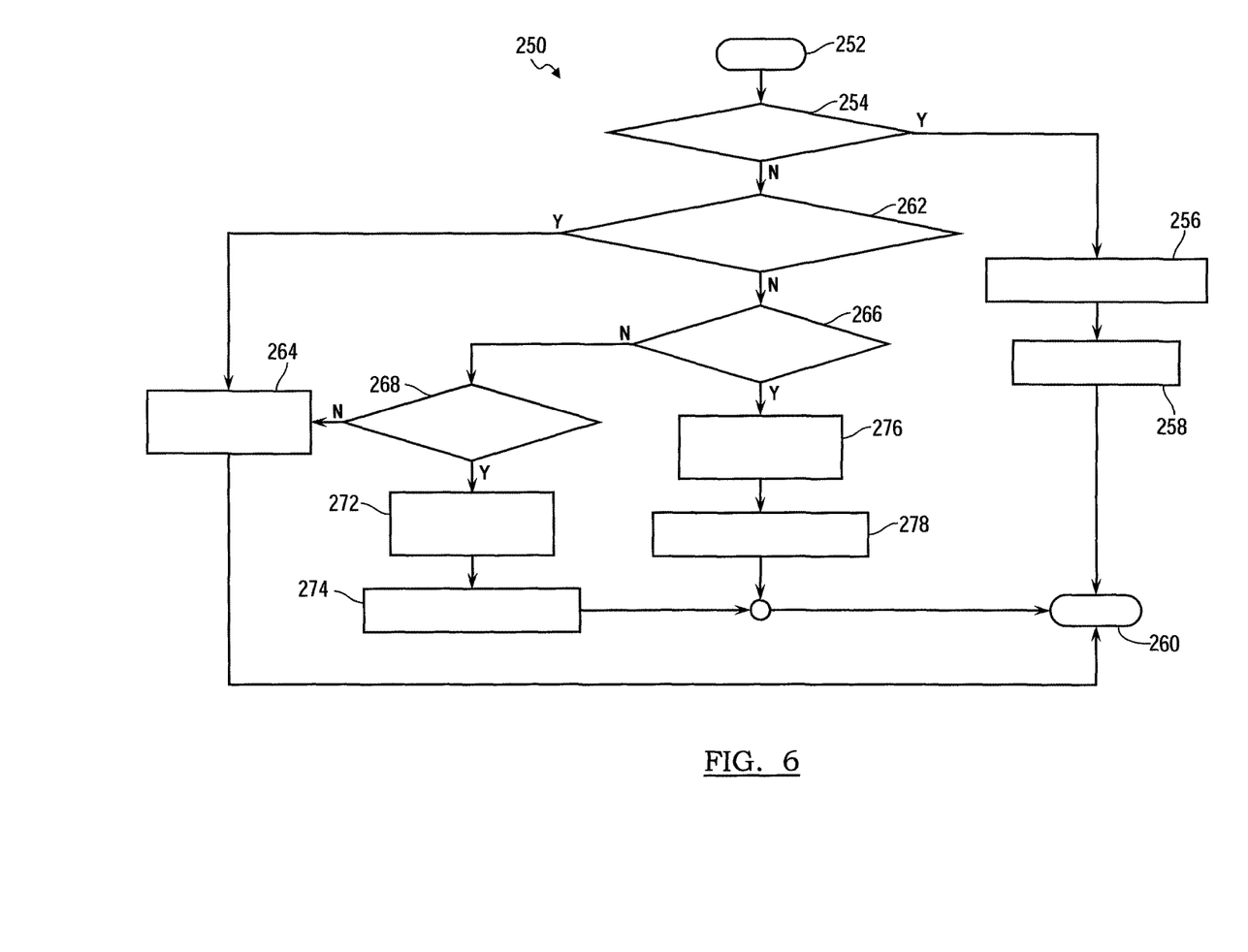
FIG. 6 is a flow chart of the method of the present invention illustrating a shift request for Drive or Neutral while in Reverse range.

Referring now to FIG. 6, an associated portion of the method 100 illustrates how the virtual null pulse or signal generated in FIG. 3 is utilized by the electronic transmission range selection system 10 to process an operator shift request for Drive range or Neutral while the transmission 40 is in the Reverse range and is generally designated by the number 250. Once again, the method 250 begins with an initializing or start step 252 and moves to a first decision point 254 which confirms that the shift lever 12 is in the Null position. Again, the word "confirms" is utilized here as described and utilized above. If the Null position of the shift lever 12 is confirmed, the first decision point 254 is exited at YES and the method 250 moves to a first process step 256 which resets any previously confirmed and set position of the shift lever 12 to Null. An associated second process step 258 then reports the new state or position of the shift lever 12 as the Null position. This portion of the method 250 then terminates at an end or termination step 260.

Returning to the first decision point 254, if it is not confirmed that the shift lever 12 is in the Null position, the first decision point 254 is exited at NO and the method 250 enters a second decision point 262 which determines whether the current confirmed position of the shift lever 12 is the same as the previously confirmed position of the shift lever 12. If it is, the second decision point 262 is exited at YES and the method 250 moves to a third process step 264 which commands the transmission 40 to the operator requested Reverse range. If the current confirmed position of the shift lever 12 is not the same as the previously confirmed position of the shift lever 12, the second decision point 262 is exited at NO and the method 250 moves to a third decision point 266 which inquires whether the confirmed position of the shift lever 12 is the Drive range. If it is not, the third decision point 266 is exited at NO and a fourth decision point 268 is encountered which inquires whether the confirmed position of the shift lever 12 is Neutral. If it is not, the method 250 exits the fourth decision point 268 at NO and returns to the third process step 264 which commands the transmission 40 to the operator requested Reverse range. If the fourth decision point 268 determines that the confirmed position of the shift lever 12 is Neutral, it is exited at YES and the method 250 moves to a fourth process step 272 which commands the transmission 40 to Neutral. From the fourth process step 272, the method 250 moves to a fifth process step 274 which resets the previously confirmed position of the shift lever 12 to Neutral. The method 250 then terminates at the end point or termination step 260.

Returning to the third decision point 266, if the current confirmed position of the shift lever 12 is the Drive range, the third decision point 266 is exited at YES and the method 250 moves to a sixth process step 276 which commands the transmission 40 to the operator requested Drive range. The method 250 then moves to the seventh process step 278 which resets the previously confirmed position of the shift lever 12 to Drive. The method 250 then terminates at the end point or termination step 260.

It will be appreciated that the methods 150, 200 and 250 described directly above in connection with FIGS. 4, 5 and 6 are utilized in conjunction with the virtual Null generating method 100 of FIG. 3 to accept operator shift commands entered by the vehicle operator through the shift lever 12 to change from one operating range or state to another. For example, the method 150 of FIG. 4 operates in conjunction with the method 100 of FIG. 3 when a Reverse or Neutral request is received from the operator when the transmission is in Drive; the method 200 of FIG. 5 operates in conjunction with the method 100 of FIG. 3 when a Reverse or Drive request is received from the operator when the transmission 40 is in Neutral and the method 250 of FIG. 6 operates in conjunction with the method 100 of FIG. 3 when a Drive or Neutral request is received from the operator when the transmission 40 is in Reverse.

The description of the invention is merely exemplary in nature and variations that do not depart from the gist of the invention are intended to be within the scope of the invention. Such variations are not to be regarded as a departure from the spirit and scope of the invention.

What is claimed is:

1. A method for providing a virtual null position in a control system for an electronic transmission range selection system, comprising the steps of:
    determining the current position of a shift lever,
    confirming the position of the shift lever,
    providing virtual null and physical reverse to neutral confirmation timers,
    selecting virtual null and physical reverse to neutral confirmation timer thresholds,
    incrementing the virtual null and physical reverse to neutral confirmation timers,
    determining that the virtual null timer has expired, and
    generating a virtual null pulse.

2. The method of claim 1 wherein the virtual null pulse enables or rejects certain operator shift requests.

3. The method of claim 1 further including the step of a determining whether the virtual null and physical reverse to neutral confirmation timers have started.

4. The method of claim 1 wherein the confirming step repeatedly determines the same position of the shift lever.

5. The method of claim 1 further including the step of a determining a current selected range of the electronic transmission.

6. The method of claim 1 further including the step of determining a current state of a shift interlock switch.

7. The method of claim 1 further including the step of determining that a shift interlock switch is not activated and providing a signal that reverse gear selection will not be acted upon.

8. A method for providing a virtual null position between positions of a shift lever in an electronic transmission range selection system, comprising the steps of:
    determining the current position of a shift lever,
    confirming the position of the shift lever,
    providing virtual null and physical reverse to neutral confirmation timers,
    incrementing the virtual null and physical reverse to neutral confirmation timers,
    determining that the virtual null timer has expired, and
    generating a virtual null pulse.

9. The method of claim 8 wherein the virtual null pulse enables or rejects certain operator shift requests.

10. The method of claim 8 further including the step of determining whether the virtual null and physical reverse to neutral confirmation timers have started.

11. The method of claim 8 wherein the confirming step repeatedly determines the same position of the shift lever.

12. The method of claim 8 further including the step of providing a shift interlock switch.

13. The method of claim 12 further including the step of determining that the shift interlock switch is not activated and providing a signal that a reverse gear selection will not be acted upon.

14. A method of providing a virtual null position between a physical reverse position and a physical neutral position of a shift lever in an electronic transmission range selection system, comprising the steps of:
    determining the current position of a shift lever,
    confirming the position of the shift lever,
    providing virtual null and physical reverse to neutral confirmation timers,
    incrementing the virtual null and physical reverse to neutral confirmation timers,
    determining that the virtual null timer has expired,
    generating a virtual null pulse, and
    determining an operator range request.

15. The method of claim 14 wherein the virtual null pulse enables or rejects certain operator shift requests.

16. The method of claim 14 further including the step of determining whether the virtual null and physical reverse to neutral confirmation timers have started.

17. The method of claim 14 wherein the confirming step repeatedly determines the same position of the shift lever.

18. The method of claim 14 further including the step of providing a shift interlock switch on the shift lever.

19. The method of claim 18 further including the step of determining that the shift interlock switch is not activated and providing a signal that a reverse gear selection will not be acted upon.

* * * * *